US005524734A

United States Patent [19]
Hanada

[11] Patent Number: 5,524,734
[45] Date of Patent: Jun. 11, 1996

[54] BRAKE APPARATUS FOR A BICYCLE WHICH CORRECTS BRAKING FORCE IN A REGION OF STRONG BRAKING FORCE

[75] Inventor: Mitsugu Hanada, Sakai, Japan

[73] Assignee: Shimano, Inc., Sakai, Japan

[21] Appl. No.: 252,871

[22] Filed: Jun. 2, 1994

[30] Foreign Application Priority Data

Jun. 7, 1993 [JP] Japan ................... 5-030294 U
Jun. 28, 1993 [JP] Japan ..................... 5-156720

[51] Int. Cl.⁶ .................. B62L 1/00; B62L 3/00
[52] U.S. Cl. ............................. 188/26; 188/323
[58] Field of Search .................. 188/26, 24.11, 188/323, 78, 343, 23, 82, 84

[56] References Cited

U.S. PATENT DOCUMENTS 2,985,269  5/1961  Gleasman .................. 188/26

FOREIGN PATENT DOCUMENTS

| 0482559 | 4/1992 | European Pat. Off. |
| 2817359 | 10/1978 | Germany ............ 188/26 |
| 2-35897 | 3/1990 | Japan ........... B62L 1/100 |
| 52-62281 | 10/1993 | Japan ............... 188/26 |
| 256178 | 2/1946 | Switzerland. |
| 357824 | 10/1931 | United Kingdom ..... 188/26 |

*Primary Examiner*—Matthew C. Graham
*Attorney, Agent, or Firm*—James A. Deland

[57] ABSTRACT

A hub brake apparatus for use on an axle fixed to a frame of a bicycle. The apparatus includes a hub rotatable in a first direction about the axle when the bicycle moves forward, a brake drum rotatable with the hub, brake shoes arranged around the axle and radially inwardly of the brake drum to be movable between a first position for frictionally engaging the brake drum and a second position retracted from the brake drum, a ring spring for biasing the brake shoes toward the second position, and a cam mechanism disposed radially inwardly of the brake shoes for moving the brake shoes from the second position to the first position. The cam mechanism includes intermediate members having radially outward portions for contacting the brake shoes, and a cam disposed radially inwardly of the intermediate members and having peripheral portions for contacting the intermediate members. The peripheral portions of the cam define inclined surfaces opposed to the intermediate members. Each of the inclined surfaces has a radius from the axle diminishing in the first direction. The inclined surfaces displace the intermediate members radially outwardly into pressure contact with the brake shoes when the cam is manually rotated in the first direction.

12 Claims, 7 Drawing Sheets

BRAKE APPARATUS FOR A BICYCLE WHICH CORRECTS BRAKING FORCE IN A REGION OF STRONG BRAKING FORCE

BACKGROUND OF THE INVENTION

1. Field of the Invention

This invention relates to a brake apparatus for a bicycle, and more particularly to a device for correcting a braking force especially in a region of strong braking force.

2. Description of the Related Art

FIG. 7 shows a conventional roller type hub brake for a bicycle. The hub brake includes a brake drum 1, brake shoes 2 movable into pressure contact with the brake drum 1, a plurality of rollers 3 for pressing the brake shoes 2 upon the brake drum 1, and a brake operating cam 4 for pushing the rollers 3 to press the brake shoes 2 upon the brake drum 1.

The cam 4 is rotatable in a direction of arrow "a" about an axle 7 with an operation of a control arm 5. The cam 4 has inclined surfaces 4a for radially outwardly pushing the rollers 3. As a result, the brake shoes 2 are pressed upon inner surfaces of the drum 1 to apply a braking force thereto.

In the above construction, the drum 1 is rotatable in a direction of arrow "c", opposite to the rotating direction of the cam 4, as the bicycle runs forward. When the braking force is applied with the brake shoes 2 contacting the inner surfaces of the drum 1, the brake shoes 2 are moved by a frictional force in the same direction as the drum 1, i.e. counterclockwise in FIG. 7. With this movement of the brake shoes 2, the rollers 3 also move counterclockwise. Since the inclined surfaces 4a of the cam 4 have a height increasing as they extend counterclockwise, the rollers 3 move radially outwardly as they move counterclockwise, thereby increasing the braking force.

Consequently, the conventional drum brake apparatus applies a greater braking force to the bicycle than a braking force corresponding to an operating force applied to a brake lever not shown. This makes it difficult to effect a fine adjustment of the braking force.

SUMMARY OF THE INVENTION

An object of the present invention is to provide a hub brake apparatus which applies a braking force corresponding to a brake lever operating force, to realize high efficiency and improved operability in an actual braking region.

The above object is fulfilled, according to the present invention, by a hub brake apparatus for use on an axle fixed to a frame of a bicycle, and controllable through a manually operable brake control device, the apparatus comprising a hub rotatable in a first direction about the axle when the bicycle moves forward, a brake drum rotatable with the hub, brake shoes arranged around the axle and radially inwardly of the brake drum to be movable between a first position for frictionally engaging the brake drum and a second position retracted from the brake drum, biasing means for biasing the brake shoes toward the second position, and cam means disposed radially inwardly of the brake shoes and operable in response to a manual operation of the brake control device to apply a pressure in a direction to move the brake shoes from the second position to the first position. The above pressure increases in proportion to an amount of operation of the brake control device before the amount of operation reaches a predetermined value, and decreases after the amount of operation reaches the predetermined value.

With the above construction, the pressure applied to the brake shoes decreases when an amount of operation of the brake control device reaches a predetermined value. Consequently, a subtle control of the brake may be effected, compared with the conventional brake apparatus which applies a great braking force in response to an amount of operation of the brake control device.

Further and other objects, features and effects of the invention will become more apparent from the following more detailed description of an embodiment of the invention taken with reference to the accompanying drawings.

DETAILED DESCRIPTION OF THE PREFERRED EMBODIMENT

An embodiment of the present invention will be described with reference to the drawings.

Figure 1:
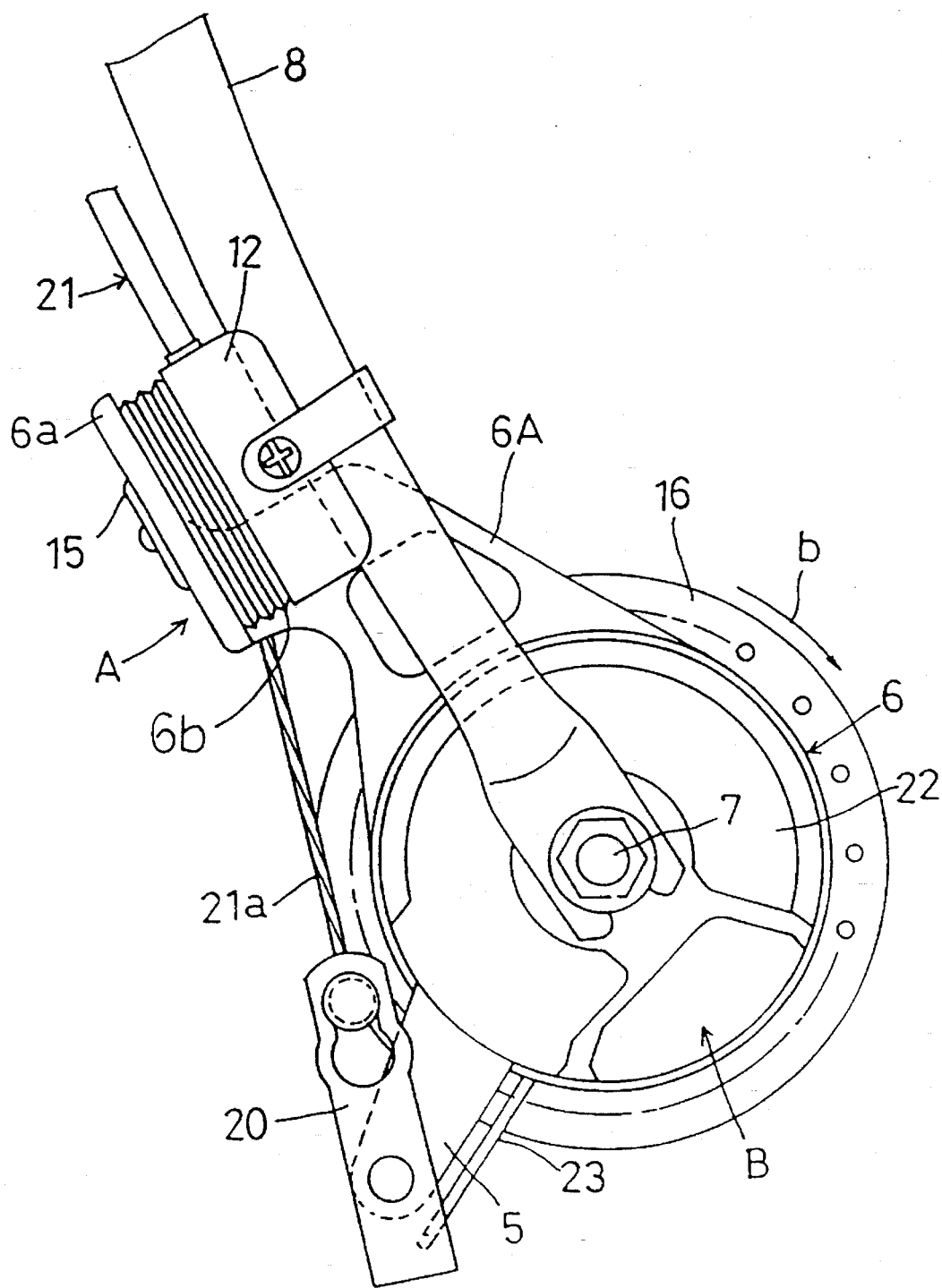
FIG. 1 is a view of a hub brake according to the present invention, acting as a front brake a bicycle, the hub brake being mounted on an axle attached to a fork.
Figure 5:
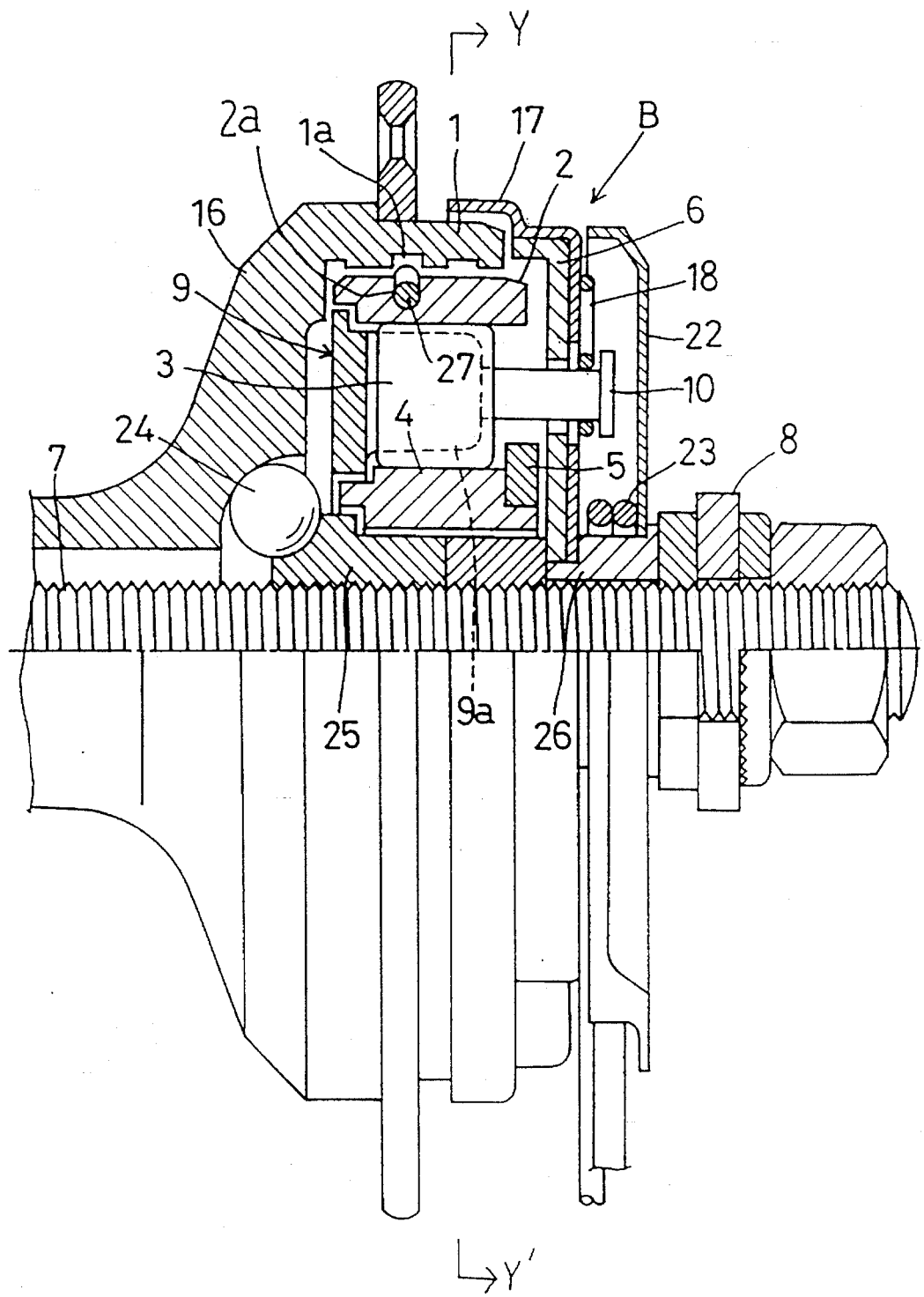
FIG. 5 is a sectional front view of the hub brake taken through the axle.
Figure 6:
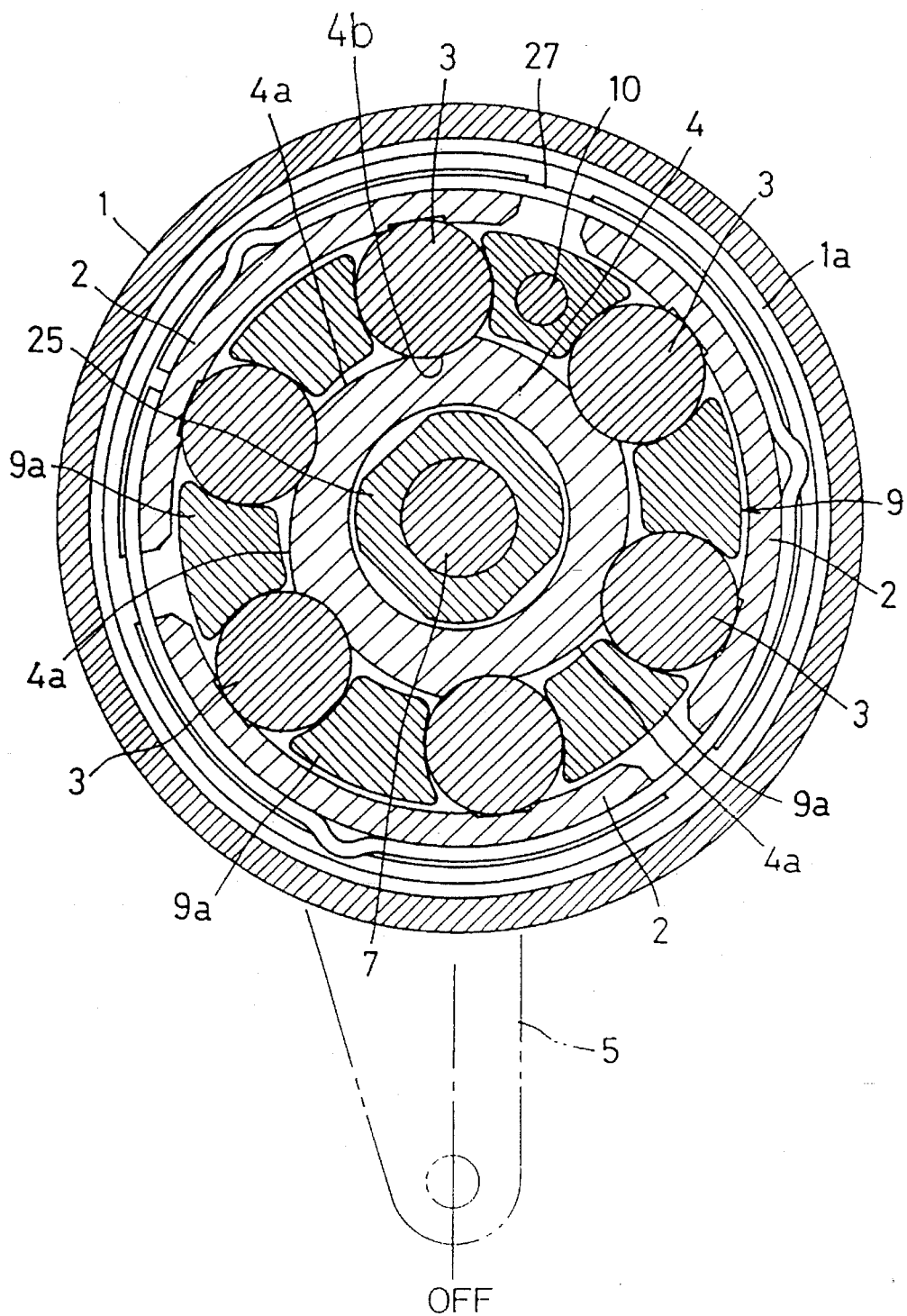
FIG. 6 is a section taken on line Y—Y' of FIG. 5 and showing an important portion of the hub brake in an inoperative state.

In this embodiment, a brake apparatus according to the invention is applied to the front wheel of a bicycle. The direction in which the wheel turns with a forward movement of the bicycle is hereinafter referred to as a first direction. FIG. 1 shows a side view of a front wheel hub brake B, and FIGS. 5 and 6 show sections thereof. As seen in FIGS. 5 and 6, the hub brake B includes a brake drum 1 formed integral with a wheel hub 16, brake shoes 2, rollers 3, a brake operating cam 4 and a control arm 5. As seen in FIG. 1, the brake shoes 2, rollers 3 and brake operating cam 4 are supported by a brake frame 6 rotatably mounted on a front axle 7. The brake frame 6 includes an arm 6A attached to a bicycle fork 8 through a device A having elastic elements described later. In FIG. 5, reference 1a denotes a grease holding section, 24 denotes balls, and 25 denotes a ball presser. The brake frame 6 is supported to be rotatable relative to a bush 26.

As shown in FIG. 6, the hub brake B in this embodiment has six rollers 3. These rollers 3 are arranged radially inwardly of the brake shoes 2. Each roller 3 has a substantially cylindrical shape and extends substantially parallel to the axle 7. Each brake shoe 2 is in contact with two rollers 3. This embodiment employs three brake shoes 2. The brake shoes 2 are movable between a first position for frictional engaging the brake drum 1 disposed radially outwardly thereof, and a second position out of engagement therewith. That is, the brake shoes 2 are movable radially outwardly into contact with the brake drum 1. This position is the first position. The brake shoes 2 are movable radially inwardly out of engagement, i.e. to the second position. As shown in FIG. 5, the brake shoes 2 define peripheral grooves 2a in which a ring spring 27 is mounted to bias the brake shoes 2 toward the second position.

Figure 4:
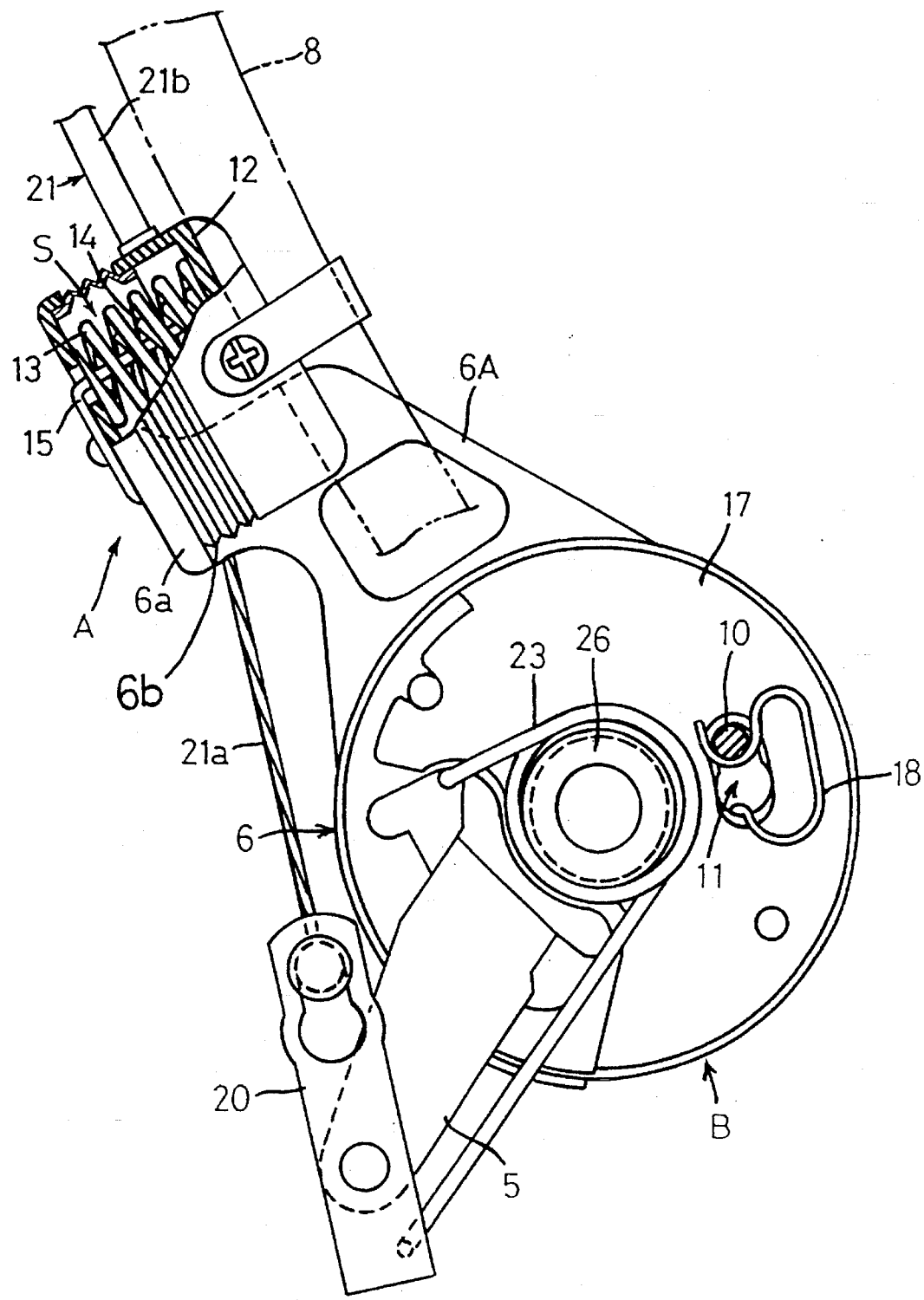
FIG. 4 is a view of the hub brake shown in FIG. 1, with an ornamental cap removed.

As shown in FIG. 6, the six rollers 3 are maintained at equal intervals by a holder 9 having six holder projections 9a each lying between an adjacent pair of rollers 3. Each holder projection 9a has contacting surfaces shaped to correspond to the cylindrical shape of the rollers 3. One of the six holder projections 9a has a pin 10 which, as shown in FIG. 4, extends through a bore 11 formed in the brake frame 6. An extreme end of the pin 10 projecting from a waterproofing cap 17 is engaged with a return spring 18.

The control arm 5 is rigidly attached to the brake operating cam 4. The control arm 5 extends outwardly through a cutout of the waterproofing cap 17. The control arm 5 is biased in a brake releasing direction, i.e. away from the first position, by a return spring 23 mounted between the waterproofing cap 17 and an ornamental cap 22 disposed axially outwardly of the waterproofing cap 17.

As shown in FIG. 1, an inner wire 21a of a brake cable 21 is connected to a distal end of the control arm 5 through a wire coupler 20. An outer wire 21b of the cable 21 is supported by a receiver 19 of a spring bearing 12 (see FIG. 2) described later.

Figure 7:
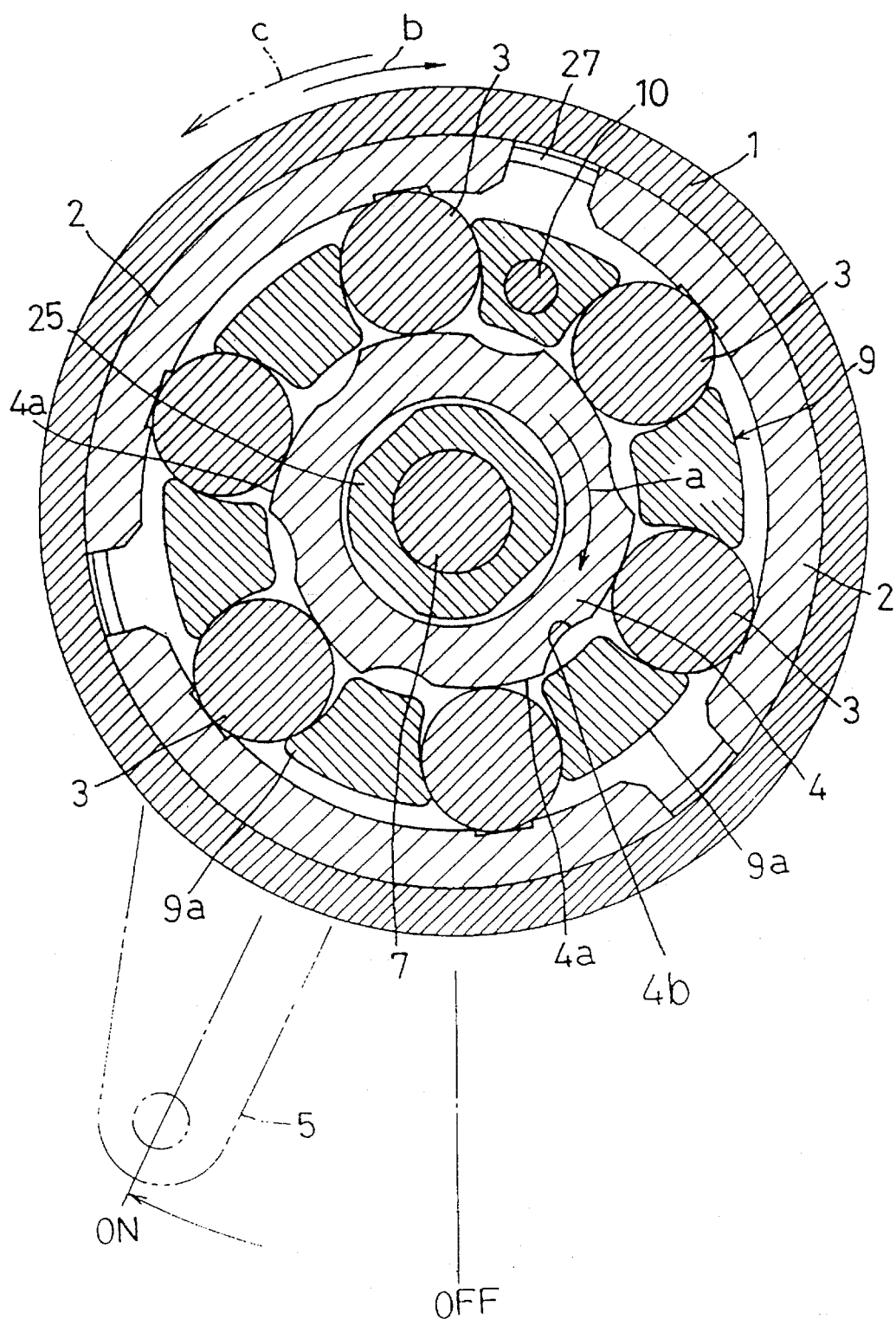
FIG. 7 is a view similar to FIG. 6 and showing the important portion of the hub brake in an operative state.

The configuration of the brake operating cam 4 which is an important feature of the present invention will be described next with reference to FIG. 7. The brake operating cam 4 defines inclined peripheral surfaces 4a corresponding in number to the rollers 3. The cam 4 further defines peripheral grooves 4b for receiving the rollers 3, when the brake is released. As shown in FIGS. 6 and 7, the grooves 4b are shaped to correspond to the shape of rollers 3. Each inclined surface 4a is shaped to displace the roller 3 radially outwardly when the brake operating cam 4 rotates in the first direction, i.e. the direction in which the wheel rotates with a forward movement of the bicycle, or clockwise in FIG. 6. That is, the inclined surfaces 4a have a radius from the axle 7 diminishing in the first direction.

Operations of the hub brake according to the present invention will be described next.

When a front brake lever (not show) is operated, its displacement is transmitted through the inner wire 21a to the control arm 5. Consequently, as shown in FIG. 7, the control arm 5 pivots about the axle 7 in the first direction indicated by arrow "b", rotating the brake operating cam 4. With the rotation of the brake operating cam 4, the inclined surfaces 4a displace the rollers 3 radially outwardly. The rollers 3 in turn push the brake shoes 2 radially outwardly into contact with the brake drum 1. Since the brake shoes 2 frictionally engage the brake drum 1 rotating in the "b" direction at this time, a force acts in the "b" direction on the brake shoes 2 to move the rollers 3 and holder 9 slightly in that direction. When the brake lever is released, the brake shoes 2 return to the second position or non-engaging position under the force of ring spring 27. The rollers 3 and holder 9 return to original positions under the force of return spring 18. The control arm 5 also returns to its original position under the force of return spring 23.

With an increase in the amount of operation of the brake lever, the brake shoes 2 begin to make the frictional engagement with the brake drum 1. At this stage, the braking force increases in proportion to the amount of operation of the brake lever. However, when the amount of operation reaches a predetermined value, the brake shoes 2 are driven in the rotating direction of the brake drum 1 due to the frictional engagement therebetween. At the same time, the rollers 3 move toward the lower ends of the inclined surfaces 4a, thereby diminishing the friction between the brake shoes 2 and brake drum 1. With the conventional brake apparatus similar to this brake apparatus, an increase in the amount of operation of the brake lever results in application to the bicycle of a greater braking force than what is intended by the rider. On the other hand, with the brake apparatus according to the present invention, the braking force increases in proportion to the amount of operation up to a certain extent but thereafter the braking force diminishes. Thus, this brake apparatus enables a fine adjustment of the braking force, as distinct from the conventional brake apparatus. The brake operating cam 4 and rollers 3 in this embodiment may be regarded as a camming device to increase the pressure for pressing the brake shoes 2 upon the brake drum 1 with an increase in the amount of operation of the brake lever, and to diminish the pressure when the amount of operation reaches the predetermined value.

As shown in FIGS. 1 through 4, a device A having elastic elements is provided between the arm 6A fixed to the hub brake and the fork 8. This device A will be described next.

The brake frame 6 supporting the brake shoes 2, holder 9 and rollers 3 is rotatably supported by the axle 7 through a boss 26 shown in FIG. 4.

Figure 2:
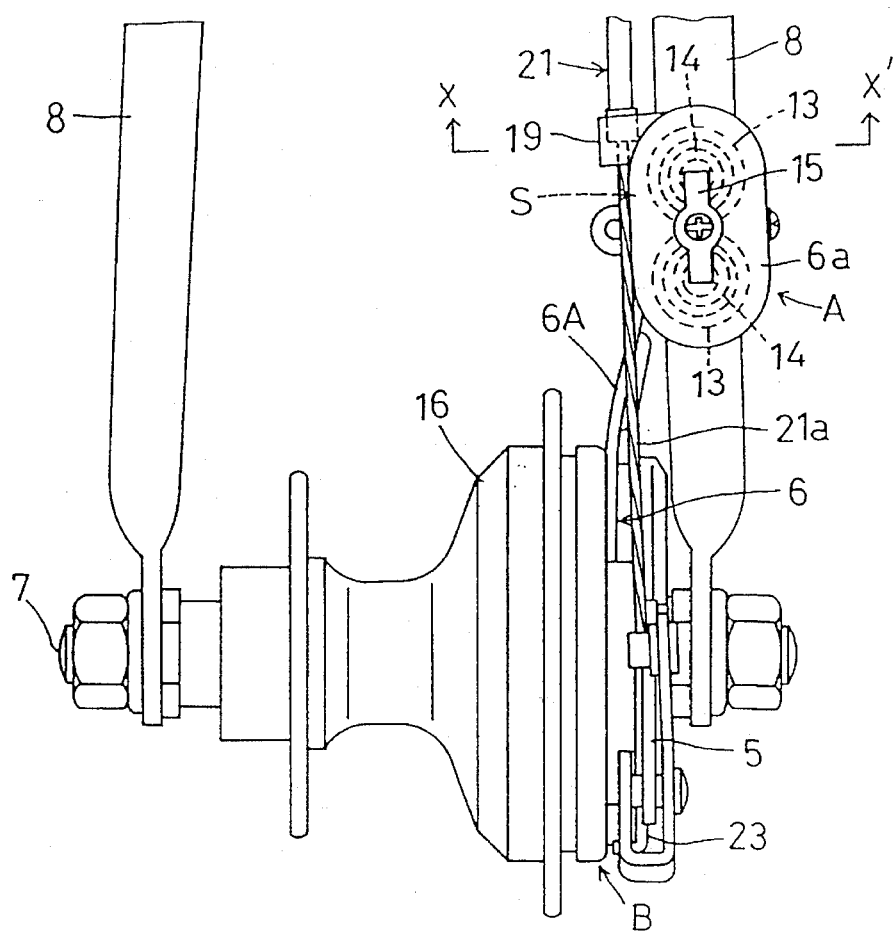
FIG. 2 is a front view of the hub brake shown in FIG. 1.

The brake frame 6 has the arm 6A extending substantially along the front fork 8. The arm 6A has a distal end thereof connected to a mount 12 acting also as a case with which a bellows-like coupling member 5b is formed integral. The mount 12 is attached to the front fork 8 adjacent a lower end thereof. Coil springs 13 and 14 are mounted around a fixed pin 15 of the mount 12. The springs 13 and 14 have different diameters and are arranged concentrically. As shown in FIG. 2, this embodiment includes two pairs of coil springs 13 and 14. That is, the brake frame 6 is connected to the fork 8 through the coil springs 13 and 14, instead of being directly fixed to the fork 8. When the brake lever is operated, the brake shoes 2 contact the brake drum 1. Then, the brake shoes 2 receive a force acting in the rotating direction of the brake drum 1 (i.e. the first direction "b"). Thus, the force acting in the first direction is applied to the brake frame 6 through the rollers 3 and holder 9.

With the force acting on the brake frame 6, the arm 6A pivots about the axle 7 until the biasing force of springs 13 and 14 balances the force from the brake frame 6. With an increase in the pressure of the brake shoes 2 against the brake drum 1, an increased braking reaction is applied to the brake frame 6. Then, the brake frame 6 further pivots in the first direction "b", elastically deforming the coil springs 13 and 14.

Figure 8:
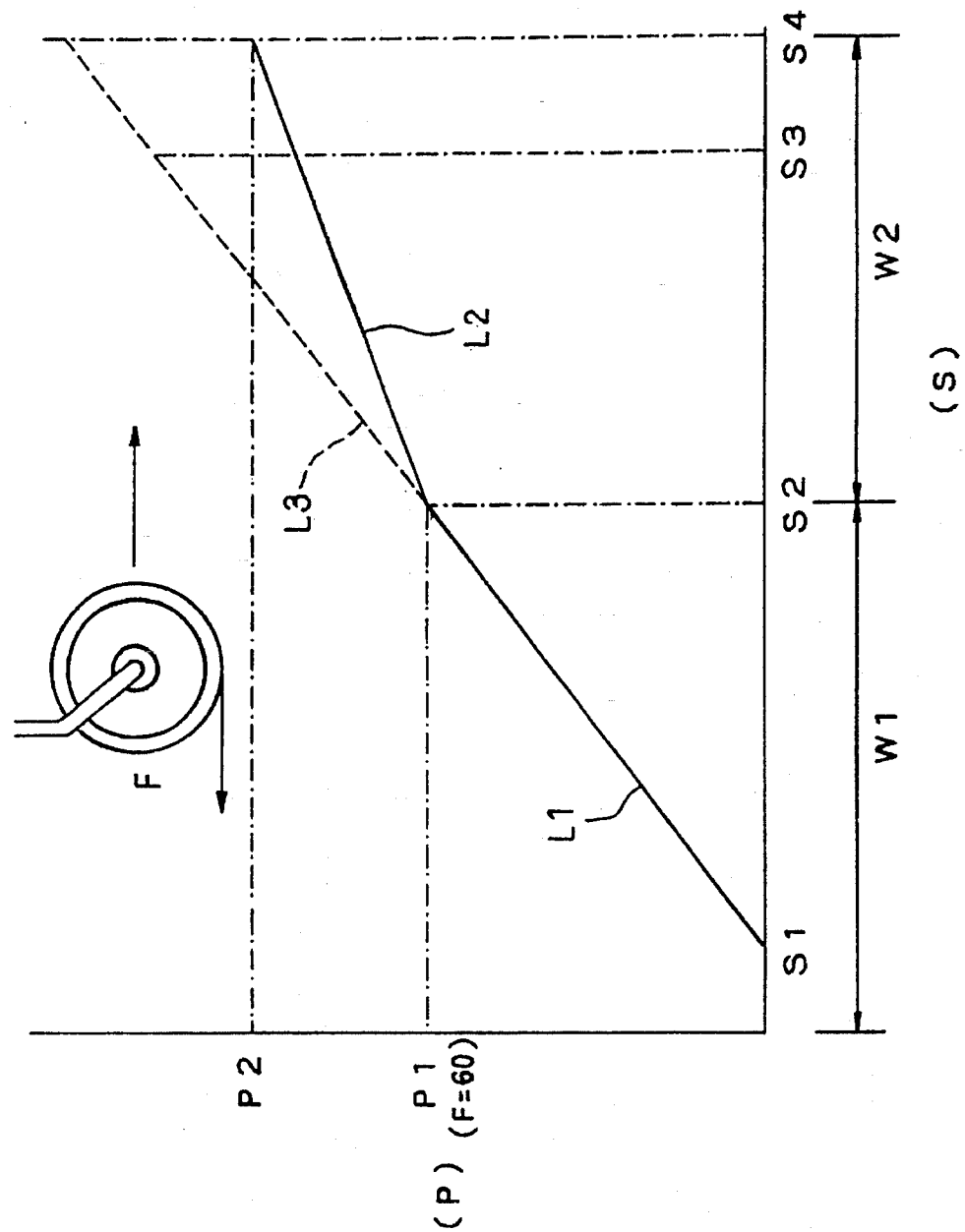
FIG. 8 is a view showing variations in a braking force with amounts of operation of a brake lever, due to functions of a device including the elastic elements disposed between a holder of the hub brake and a bicycle frame.

With the above pivotal movement in the first direction "b" of the brake frame 6, the control arm 5 also pivots together since the control arm 5 and brake operating cam 4 are rigidly interconnected and the cam 4 and rollers 3 are in pressure contact with each other. This pivotal movement of the control arm 5 relaxes the inner wire 21a pulling the control arm 5 toward an ON position, i.e. a braking position, thereby diminishing a tensile force of the inner wire 21a. This results in a decrease in the braking force actually applied to the brake drum 1. With the plurality of coil springs 13 and 14 used to receive and support the brake frame 6, the elasticity of the coil springs 13 and 14 combined is appropriately fine-adjusted. FIG. 8 shows variations in the braking force of the hub brake B occurring with a gripping operation from a release position to a stroke end of the brake lever (not shown) connected to the brake cable 21.

In FIG. 8, the horizontal axis represents operating stroke S of the brake lever, while the vertical axis represents braking force P of the hub brake B. In a braking operation, the brake shoes 2 begin to contact the brake drum 1 when the brake lever finishes a play stroke S1. With a subsequent increase in the operating stroke S of the brake lever, the braking force P of the hub brake B increases along solid line L1. When the operating stroke S of the brake lever reaches stroke S2, the hub brake B applies braking force P1. This braking force P1 corresponds to 58 to 62 pounds, i.e. around 60 pounds, when converted into a tangential force F of a 26-inch tire braked relative to the ground. When this value is set to this position of the operating stroke, maximum braking force P2 is made available during a bicycle run, without deforming the front fork 8 and without locking the wheel. At this point, the coil springs 13 and 14 begin to be elastically deformed to lower the braking force automatically. With a further increase in the operating stroke S of the brake lever, the braking force P of the hub brake B increases along solid line L2. In the absence of the elastic deformation of the coil springs 13 and 14, an increase in the operating stroke S of the brake lever would cause the braking force P of the hub brake B to increase along broken line L3 which is an extension of solid line L1. In this embodiment, however, the same operating stroke S of the brake lever results in a reduced braking force. When the brake lever is operated during a forward run of the bicycle, the coil springs 13 and 14 are elastically deformed by the torque of the brake drum 1 applied to the brake frame 6. When the brake lever is operated during a standstill of the bicycle, the coil springs 13 and 14 are not deformed since the brake drum 1 is still and does not apply a torque to the brake frame 6. Thus, the brake lever is operable only up to the operating stroke S3 during a standstill, whereas the brake lever is operable to a greater stroke S4 than stroke S3 during a run. Consequently, when the brake lever is operated to the stroke end during a run, the hub brake B applies the maximum braking force P2. A stroke portion W1 from the release position of the brake lever to the beginning of the elastic deformation of the coil springs 13 and 14 and a stroke portion W2 from the beginning of the elastic deformation of the coil springs 13 and 14 to the stroke end are in a relationship set to W1:W2=9:8.

Figure 3:
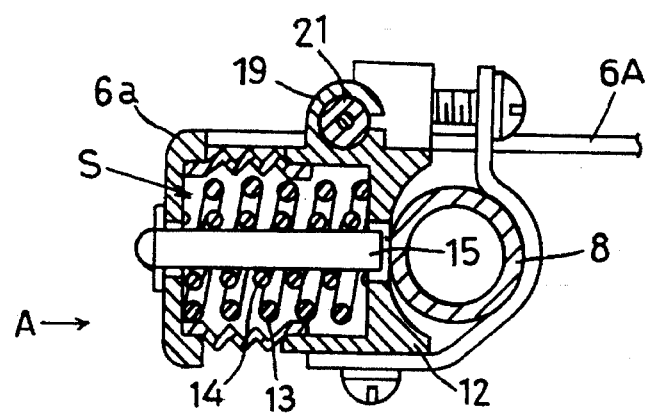
FIG. 3 is a section taken on line X—X' of FIG. 1 and showing a support member including elastic elements.

As shown in FIGS. 2 through 4, the larger coil spring 13 and smaller coil spring 14 in each pair are arranged to form a double spring structure. The pair of such double springs are arranged on the brake frame 6 longitudinally of the front fork 8 when the brake frame 6 is attached to the front fork 8. Thus, the plurality of coil springs 13 and 14 are arranged in a way to require a reduced space and to project to limited extents inwardly and outwardly from the front fork 8.

The coil springs 13 and 14 may be replaced with rubber elements, or a combination of rubber elements and coil springs may be used. Conical or hourglass-shaped springs may be employed to adjust variation characteristics of the braking force.

As in the foregoing embodiment, the brake apparatus may advantageously be applied to a front wheel to avoid wheel locking and deformation of the front fork due to an excessive braking force. However, the present invention is applicable also to a rear wheel. The present invention may be applied to a brake having a brake drum formed as a separate component and splined to a hub to be rotatable therewith, besides a brake having a drum formed integral with a hub as described. Further, the present invention may be applied to a band type brake or to an internal expanding brake with a pair of open/close brake bodies, besides a roller type brake as in the described embodiment.

What is claimed is:

1. A hub brake apparatus for use on an axle fixed to a frame of a bicycle, comprising:

a hub rotatable in a first direction about said axle when said bicycle moves forward;

a brake drum rotatable with said hub;

brake shoes arranged around said axle and radially inwardly of said brake drum to be movable between a first position for frictionally engaging said brake drum and a second position retracted from said brake drum;

biasing means for biasing said brake shoes toward said second position; and cam mechanism disposed radially inwardly of said brake shoes for moving said brake shoes from said second position to said first position, said cam mechanism including:

intermediate members having radially outward portions for contacting said brake shoes;

a cam disposed radially inwardly of said intermediate members and having peripheral portions for contacting said intermediate members;

inclined surfaces defined on said peripheral portions, said inclined surfaces being opposed to said intermediate members, each of said inclined surfaces having a radius from said axle diminishing in said first direction, said inclined surfaces displacing said intermediate members radially outwardly into pressure contact with said brake shoes when said cam is manually rotated in said first direction; and a support member for supporting said brake shoes and said intermediate members, said support member being pivotable relative to said axle.

2. A hub brake apparatus as defined in claim 1, further comprising a cam lever for transmitting a manual operating force to said cam, said cam lever being biased in a direction opposite to said first direction.

3. A hub brake apparatus as defined in claim 1, comprising three brake shoes each contactable by two intermediate members.

4. A hub brake apparatus according to claim 1, wherein said support member is connected to said frame through elastic means.

5. A hub brake apparatus as defined in claim 4, wherein said support member includes an arm, said elastic means comprising at least one coil spring disposed between said arm and said frame for imparting a biasing force in a direction opposite to said first direction.

6. A hub brake apparatus as defined in claim 5, wherein said elastic means includes a second coil spring disposed concentrically with said coil spring.

7. A hub brake apparatus as defined in claim 6, wherein said elastic means further includes two coil springs disposed concentrically with each other.

8. A hub brake apparatus as defined in claim 1, wherein each of said intermediate members is substantially cylindrical and extends substantially parallel to said axle.

9. A hub brake apparatus as defined in claim 1, wherein said biasing means comprises a substantially annular spring fitted in grooves formed peripherally of said brake shoes.

10. A hub brake apparatus as defined in claim 1, which is provided for a front wheel of said bicycle.

11. A hub brake apparatus as defined in claim 1, further comprising a plurality of holder members for checking displacement said intermediate members round said axle, each of said holder members being disposed between an adjacent pair of said intermediate members.

12. A hub brake apparatus as defined in claim 11, wherein at least one of said holder members is fixed to said support member through a pin.

* * * * *